(12) United States Patent
Nowak et al.

(10) Patent No.: US 10,995,917 B2
(45) Date of Patent: May 4, 2021

(54) HUB BASED LIGHTING SYSTEM

(71) Applicants: David Robert Nowak, Powell, TN (US); Donald K. Simmons, Jr., Ivoryton, CT (US); Luc Fortin, Quebec (CA)

(72) Inventors: David Robert Nowak, Powell, TN (US); Donald K. Simmons, Jr., Ivoryton, CT (US); Luc Fortin, Quebec (CA)

(*) Notice: Subject to any disclaimer, the term of this patent is extended or adjusted under 35 U.S.C. 154(b) by 0 days.

(21) Appl. No.: 16/813,323

(22) Filed: Mar. 9, 2020

(65) Prior Publication Data

US 2020/0284404 A1 Sep. 10, 2020

Related U.S. Application Data

(60) Provisional application No. 62/815,154, filed on Mar. 7, 2019.

(51) Int. Cl.
| | |
|---|---|
| F21S 4/28 | (2016.01) |
| F21S 8/04 | (2006.01) |
| A01G 7/04 | (2006.01) |
| F21V 15/01 | (2006.01) |
| F21S 8/06 | (2006.01) |
| F21Y 115/10 | (2016.01) |
| F21V 19/00 | (2006.01) |

(52) U.S. Cl.
CPC .......... *F21S 4/28* (2016.01); *A01G 7/045* (2013.01); *F21S 8/046* (2013.01); *F21S 8/065* (2013.01); *F21V 15/01* (2013.01); *F21S 8/061* (2013.01); *F21V 19/0055* (2013.01); *F21Y 2115/10* (2016.08)

(58) Field of Classification Search
CPC ...... F21S 4/20; F21S 4/28; F21S 8/046; A01G 7/045; F21V 19/0025; F21V 19/0045; F21V 19/0055; B60Q 1/326
See application file for complete search history.

(56) References Cited

U.S. PATENT DOCUMENTS

| | | | | | |
|---|---|---|---|---|---|
| 5,437,540 | A | * | 8/1995 | Blocker | F04D 25/088 310/232 |
| 6,036,331 | A | * | 3/2000 | Acquisto | F04D 29/005 362/96 |
| 6,688,759 | B1 | * | 2/2004 | Hadjimichael | A01G 7/045 362/405 |
| 8,072,123 | B1 | * | 12/2011 | Han | F21K 9/23 313/45 |
| 8,221,077 | B2 | * | 7/2012 | Pelshak | F04D 29/34 416/5 |
| 9,901,039 | B1 | * | 2/2018 | Dellerson | A01G 9/26 |
| 9,964,259 | B2 | * | 5/2018 | Hudson | G03B 15/02 |
| 10,842,082 | B1 | * | 11/2020 | Genga, Jr. | F21V 21/15 |
| 2008/0107527 | A1 | * | 5/2008 | Gajewski | F04D 25/088 416/5 |

(Continued)

*Primary Examiner* — Alan B Cariaso
(74) *Attorney, Agent, or Firm* — Pauley Erickson & Swanson

(57) ABSTRACT

The subject invention provides a lighting system with a light source, a plurality of spokes to house the light source and a structural hub adapted to connect to the plurality of spokes. A method of using the lighting system includes connecting the plurality of spokes to the hub, emitting light from the light source housed within the plurality of spokes and connecting the hub to an electrical connection housing.

24 Claims, 8 Drawing Sheets

(56) References Cited

U.S. PATENT DOCUMENTS

| | | | |
|---|---|---|---|
| 2011/0044045 A1* | 2/2011 | Kostka | F21V 33/0096 362/253 |
| 2012/0043907 A1* | 2/2012 | Lu | F21K 9/00 315/287 |
| 2013/0188340 A1* | 7/2013 | Richards | A45B 3/04 362/183 |
| 2018/0359934 A1* | 12/2018 | Wilmering | F21V 21/30 |
| 2019/0041048 A1* | 2/2019 | Martin | F21V 29/70 |

* cited by examiner

HUB BASED LIGHTING SYSTEM

CROSS REFERENCE TO RELATED APPLICATIONS

This application claims the benefit of U.S. application Ser. No. 62/815,154, filed on 7 Mar. 2019. The earlier provisional patent application is hereby incorporated by reference herein in its entirety and is made a part hereof including but not limited to those portions which specifically appear hereinafter.

BACKGROUND OF THE INVENTION

This invention relates generally to lighting and, more particularly, to a hub based lighting system and method for horticulture environments. In general, lighting and lighting fixtures are available in a wide variety of styles, shapes, colors and intensities. Such characteristics vary depending on the purpose of the lighting. For horticulture environments, particularly greenhouse environments, certain characteristics prove more beneficial and desirable for growing various crops and plants with artificial lighting. Horticulture environments generally desire lighting with high power densities, an optical footprint, and the ability for air and other gases to circulate freely about the lighting fixtures. Such characteristics are often difficult to achieve with the prior art as light fixtures with high power densities are often large and therefore block the free circulation of air. However, conventional shapes and large-sized fixtures are commonly needed to achieve the desired intensities and optical illumination for such growing environments.

SUMMARY OF THE INVENTION

The invention generally relates to provide an improved lighting system. The general object of the invention can be attained, at least in part, through a lighting system comprising a light source, a plurality of spokes to house the light source and a structural hub that connects to the plurality of spokes. The light source has at least one light color and at least one source of radiation. The source of radiation may be non-visible. The radiation source could be ultraviolet, infrared, or a combination. A spoke of the plurality of spokes may include a light source having a different property than an adjacent spoke. The lighting system also comprises an electrical connection housing and a mount. The mount may receive at least one sensor. The light source also has light emitting diodes.

The invention also generally relates to provide an improved method of lighting. Another object of the invention can be attained through a method of lighting comprising connecting a plurality of spokes to a hub, emitting light from a light source housed within the plurality of spokes and connecting the hub to an electrical connection housing. The method also comprises mounting sensors on the hub for monitoring a grow environment. The method further comprises changing the plurality of spokes on the hub to modify the light source for the grow environment. According to the method, the plurality of spokes may house at least one light color. Each spoke of the plurality of spokes may be controlled individually or as a group. The lighting system may also be hung by a chain. With more than one lighting system, the method may comprise connecting a spoke of the plurality of spokes to a spoke of a plurality of spokes on a neighboring lighting system. According to the method, the plurality of spokes may contain at least one radiation source. The at least one radiation source may be ultraviolet. The at least one radiation source may also be infrared.

The prior art generally fails to provide all the benefits and versatility of the lighting system and method of the claimed invention. Light fixtures of conventional shapes generally block a lot of air due to their size and are not adaptable for various uses such as required for horticulture environments. Lighting systems for horticulture environments require very high power densities, an optical footprint for the area illuminated, and the ability for air to circulate freely around and through the lighting system. The high power requires the use of large light fixture, but the size of these conventional fixtures are large and obstructive to air circulation. Therefore, a need exists for lighting systems that can provide optimum power while still maintaining proper air circulation needed for such environments to thrive.

Other objects and advantages of the invention will be apparent to those skilled in the art from the following detailed description taken in conjunction with the appended claims and drawings.

DETAILED DESCRIPTION OF THE INVENTION

Figure 1:
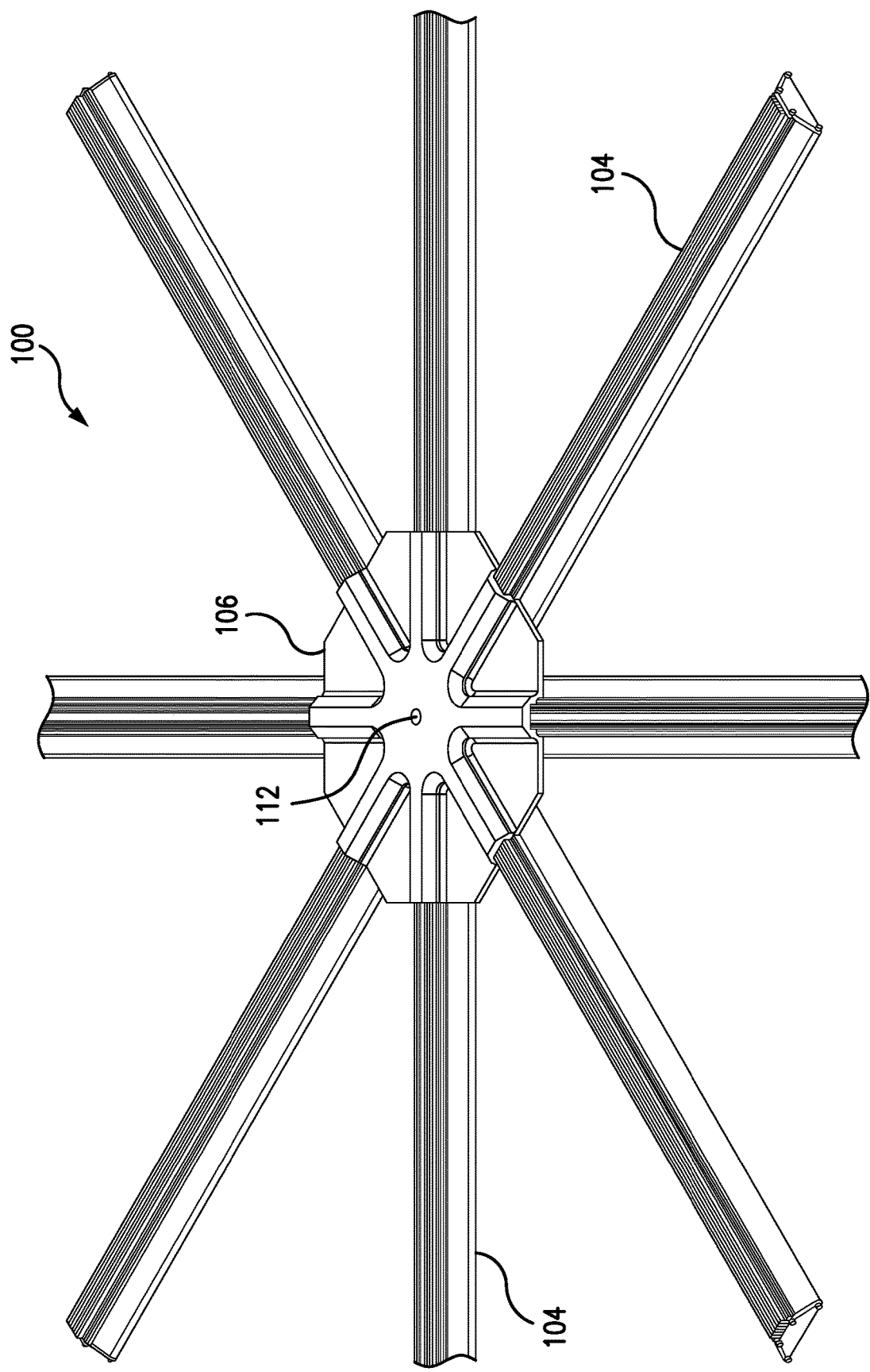
FIG. 1 is a top perspective view of a lighting system according to a preferred embodiment of the invention.

The present invention provides a lighting system 100 comprising a light source 102, a plurality of spokes 104 to house the light source 102 and a structural hub 106 that can connect to the plurality of spokes 104. Horticulture environments provide a special set of requirements with respect to lighting. Horticulture environments may include any type of agriculture of plants. Therefore, the lighting requirements of any individual horticulture environment (or a combination of various horticulture environments), may vary according to the types of plants being grown, purpose of the plants being grown (whether for food, materials, decorations, etc.), climate, location of the garden, and other relevant factors.

With all these relevant variables in horticulture environments, such lighting requires very high-power densities (w/sqft). Such lighting also may require a relatively large optical footprint for the area(s) illuminated by a lighting fixture. Such is achieved in the claimed invention as the light source 102 comprises at least one light color 108. The at least one light color 108 may be yellow, bright white, blue, red, violet, or any other desired color. The lighting may also be comprised of circuit board LED lighting. In one embodiment of the invention, the desired optical footprint is achieved where an optical size of a chosen light fixture divided by the area illuminated by the fixture should equal approximately 1 (therefore achieving an approximately 1 to 1 ratio of the optical size of the fixture to the area illuminated by said fixture).

Horticulture environments also require lighting where air can circulate freely around the lighting systems. This allows air to aid in cooling the light fixture and also to maintain and adequate circulation of gasses throughout the horticulture area. Current horticulture lighting systems are too large to where such lighting systems typically block a lot of air, thus allowing the horticulture environment to suffer. Conventional shapes of lighting fixtures also block air. In one embodiment of the claimed invention, the hub 106 and plurality of spokes 104 serve to remedy this problem in the lighting system 100. The plurality of spokes 104 may resemble arms protruding from the central hub 106. As shown in FIG. 1, the hub 106 is able to receive one or more of the plurality of spokes 104. This hub-based lighting system 100 as shown in FIG. 1 forms a structure that looks much like a wagon wheel or windmill (where the spokes 104 are akin to spokes on a wheel). In another embodiment the lighting system 100 may further contain in essence a rim portion to surround the lighting system 100 as if to create a circumference at ends of the plurality of spokes 104 that are connected in the hub 106.

Figure 2:
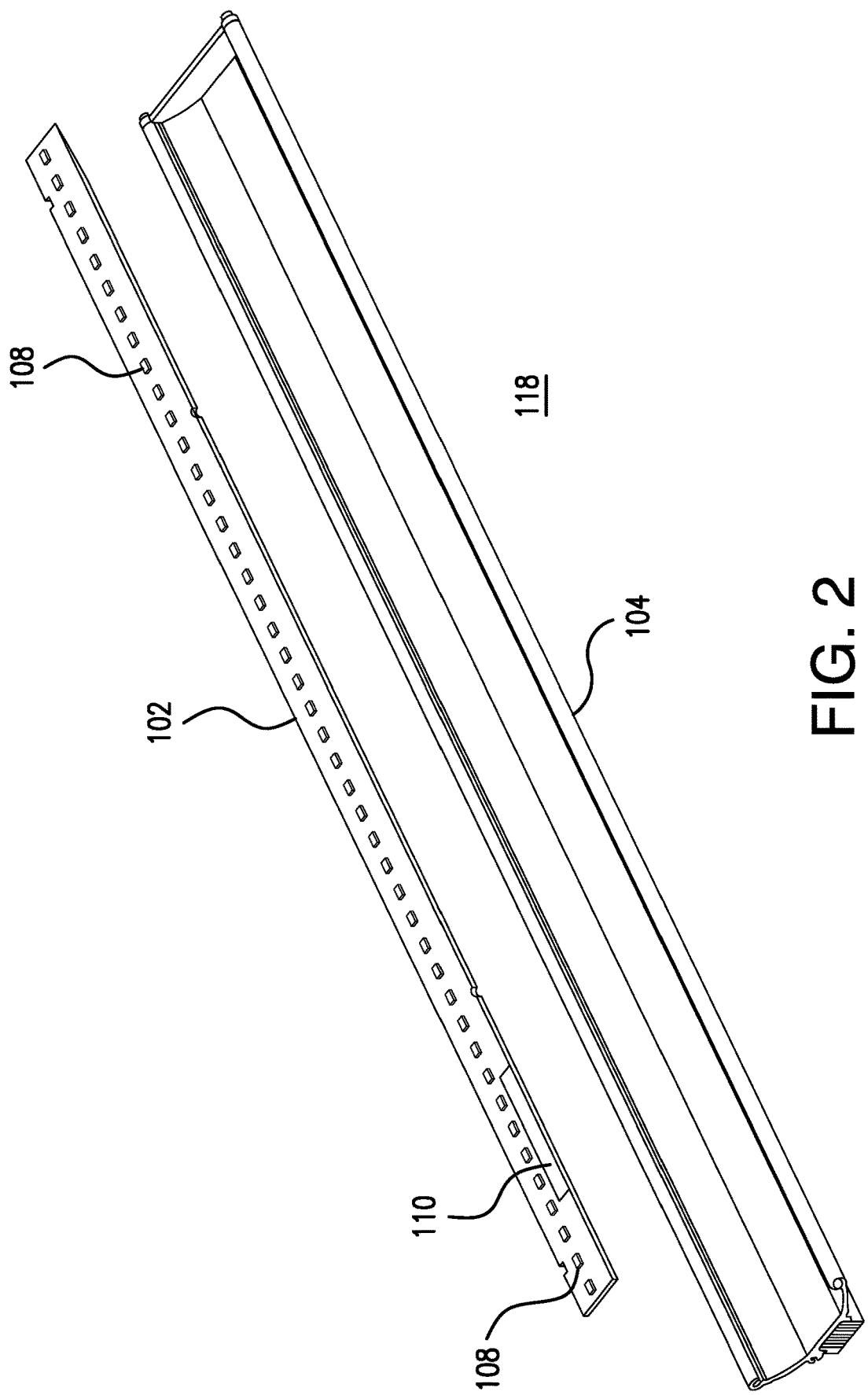
FIG. 2 is a side perspective view of a spoke and a light source of the lighting system according to the embodiment of FIG. 1.
Figure 8:
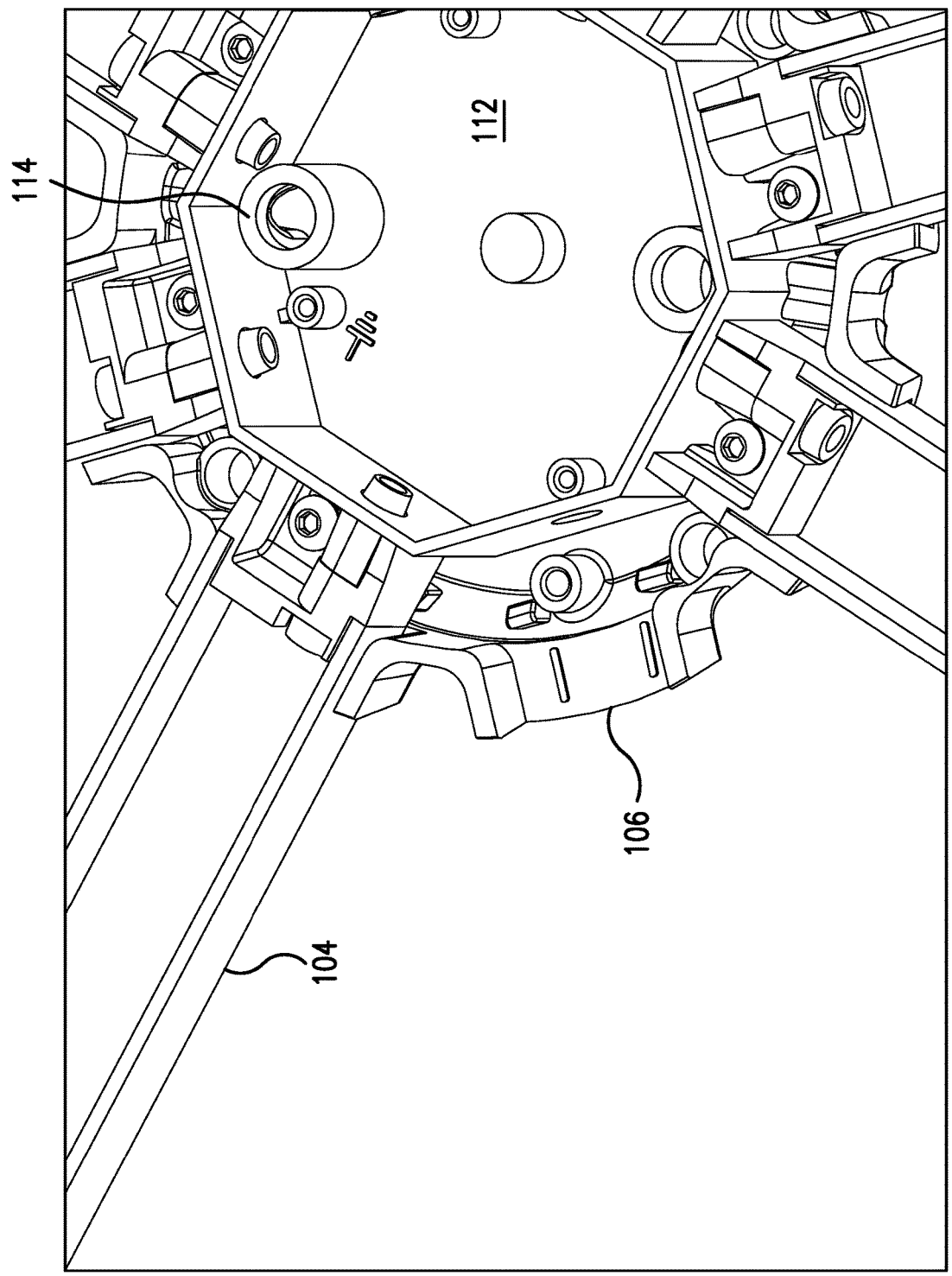
FIG. 8 is a bottom perspective view of the hub with the spoke removed from the lighting system according to the embodiment of FIG. 3.

As shown in FIG. 2, in one embodiment of the invention, the light source 102 comprises at least one radiation source 110. The radiation source 110 may be any acceptable source. In one embodiment the radiation source 110 may be non-visible. In another embodiment the radiation source 110 may be at least one of ultraviolet and infrared. It is to be understood that the light source 102 of any individual spoke 104 or combination of spokes 104 may be any combination of radiation sources 110. That is, in one embodiment at least one spoke 104 of the plurality of spokes 104 may include a light source 102 having a different property than an adjacent spoke 104. The different property may also be reflected in the light color(s) 108 as well as the radiation source 110. Any combination of light colors 108 and/or radiation sources 110 may be present on a spoke 104 of the lighting system 100. Any combination of light colors 108 and/or radiation sources 110 may also be present amongst an adjacent spoke 104 of the lighting system 100. Any combination of light colors 108 and/or radiation sources 110 may, further be present amongst any number of spokes 104 of the plurality of spokes 104 of the lighting system 100. Any combination of light colors 108 and/or radiation sources 110 may also be present amongst a plurality of lighting systems 100, adjacent or otherwise. These various combinations allow the lighting system 100 to be adapted to maintain an optimum grow environment for the desired plant or crop. Any or all spokes 104 of the plurality of spokes 104 may be changed to adapt the light source 102 for any individual or combination grow environment. One such example is where one spoke is removed, as shown in FIG. 8.

Figure 3:
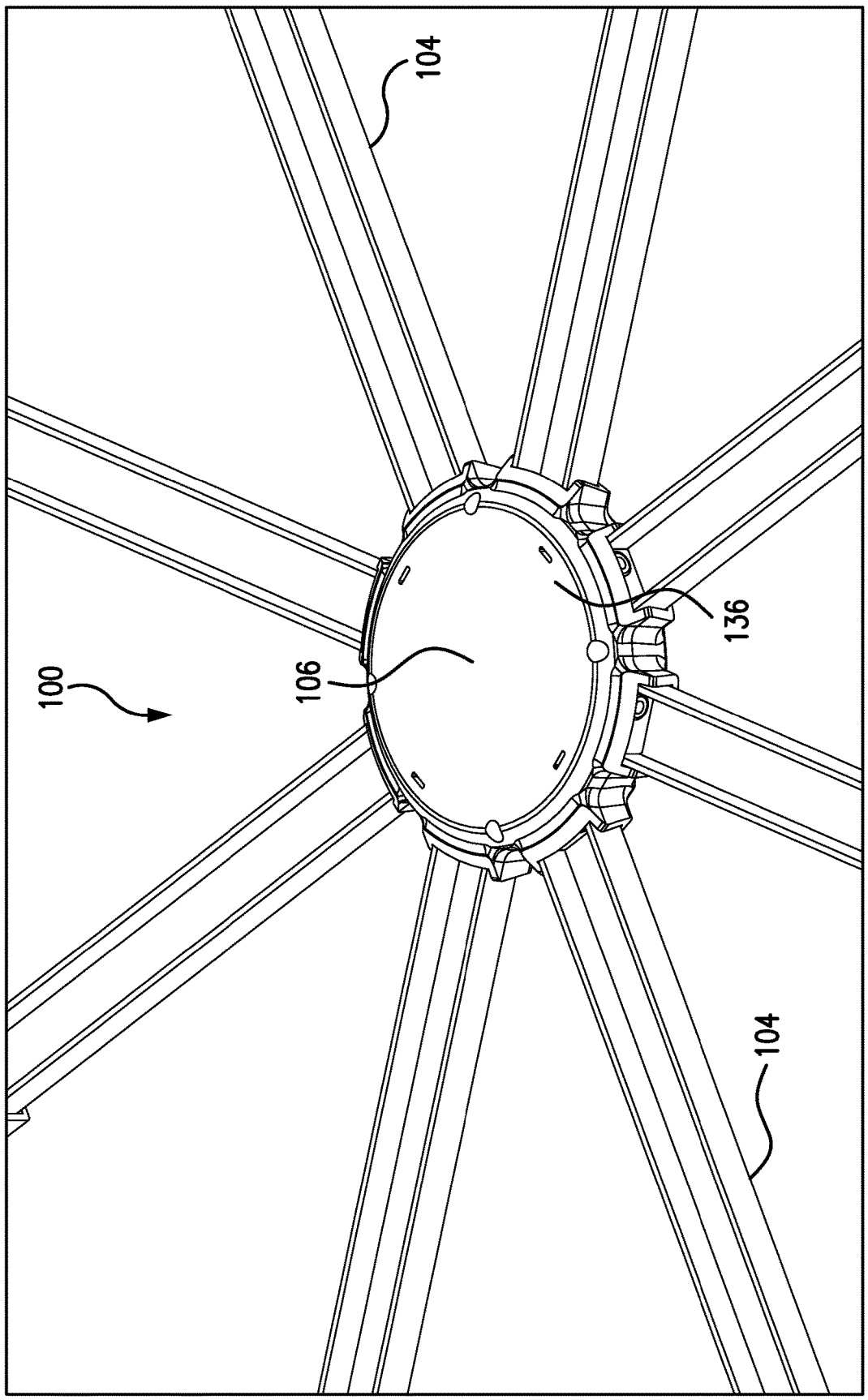
FIG. 3 is a bottom perspective view of a lighting system according to another embodiment of the invention.
Figure 4:
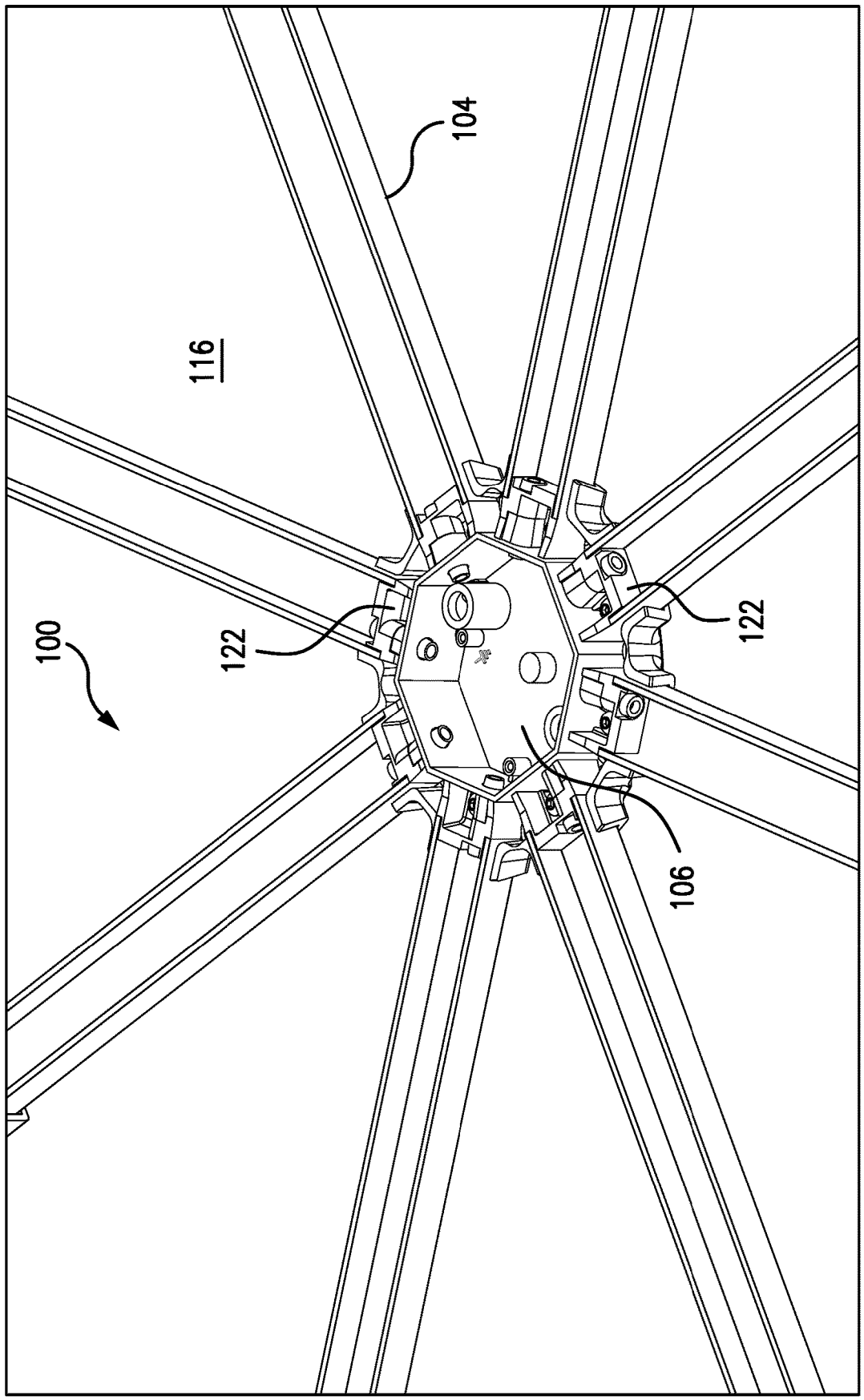
FIG. 4 is another bottom perspective view of the lighting system according to the embodiment of FIG. 3.

FIG. 3 shows a bottom view of the lighting system 100. Here, a cap 136 encloses the bottom of the hub 106. In addition to the structures above, in on embodiment of the claimed invention, as shown in FIG. 4 with the cap 136 removed, the hub 106 of the lighting system 100 may also include an electrical connection housing 112. The electrical connection housing 112 routes electricity to power the light source 102 of the lighting system 100. The light source 102 may comprise light emitting diodes 118. The lighting system 100 as also shown in FIG. 4 further includes an adapter 122 that may be associated with a spoke 104 of the plurality of spokes 104. The adapter 122 allows each of the spokes 114 to connect to the hub 106.

Figure 5:
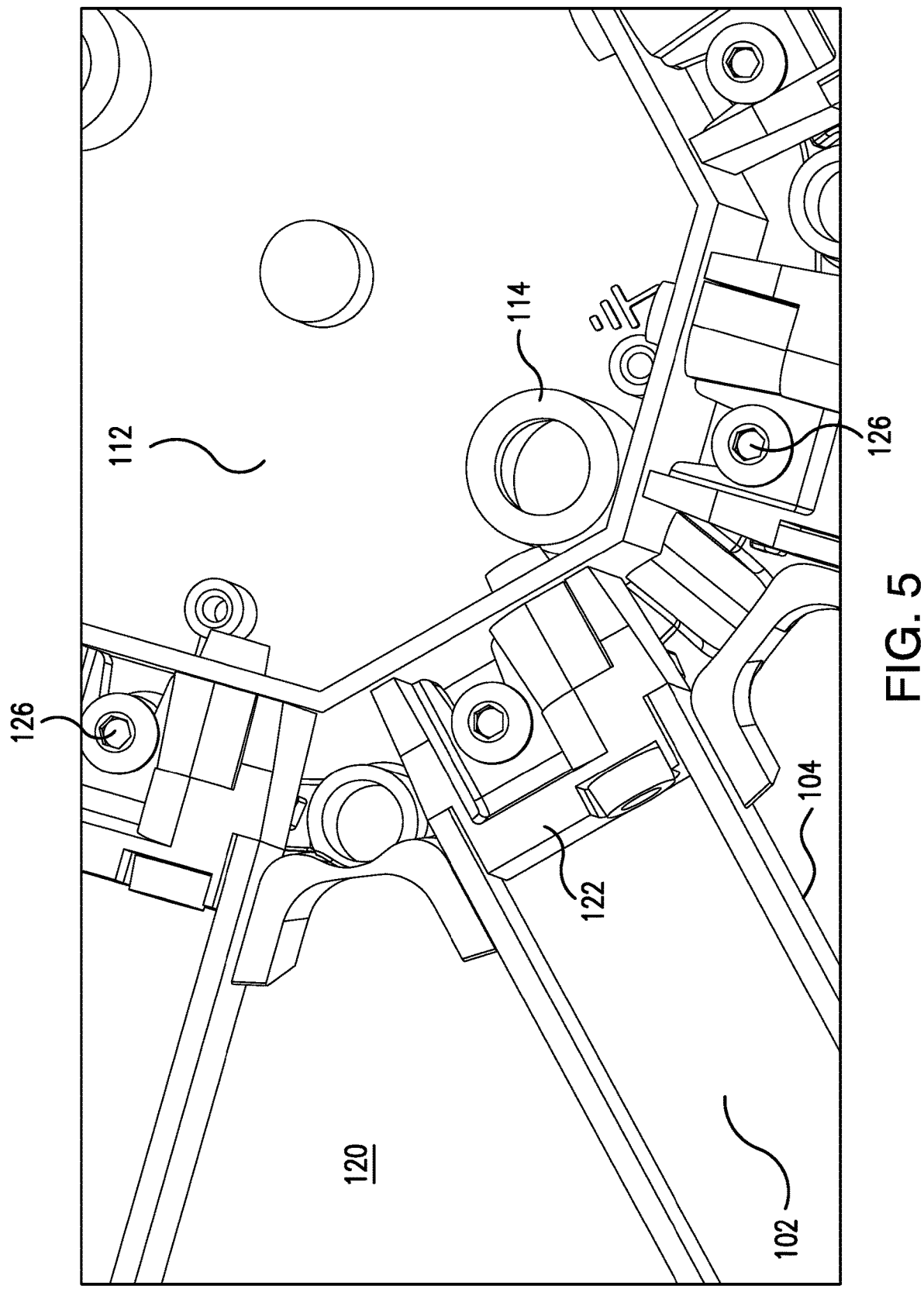
FIG. 5 is an enlarged bottom perspective view of the lighting system according to the embodiment of FIG. 3.

In yet another embodiment of the invention, the hub 106 may comprise a mount 114, as shown in FIG. 5. The mount 114 is preferably capable of receiving at least one sensor 116. The mount. 114 provides a location for the at least one sensor 116 to monitor a grow environment. As with the light source 102, the at least one sensor 116 may vary in type and purpose depending on the needs of the grow environment. The mount 144 may be in the form of any reasonable means to aid in installing the lighting system 100. In one such example, as shown in FIG. 5, the mount 114 may be in the form a hole through the hub 106 and the electrical connection housing or electrical compartment 112. The hole may provide for insertion of a wire or a chain 120 to function as the mount 114. The mount 114 may also utilize any other suitable mounting structure such as a rigid mounting system with the use of a pipe. FIG. 5 also shows the adapter 122 which may connect the spokes 104 to the hub 106 with use of friction or a fastener 126. The fastener 126 maintains a seal from the environment between the corresponding spoke 104 and the hub 106. Each fastener 126 associate with a spoke 104 may be applied or removed from the spoke 104 independently of any adjacent spoke 104 on the hub 106.

Figure 6:
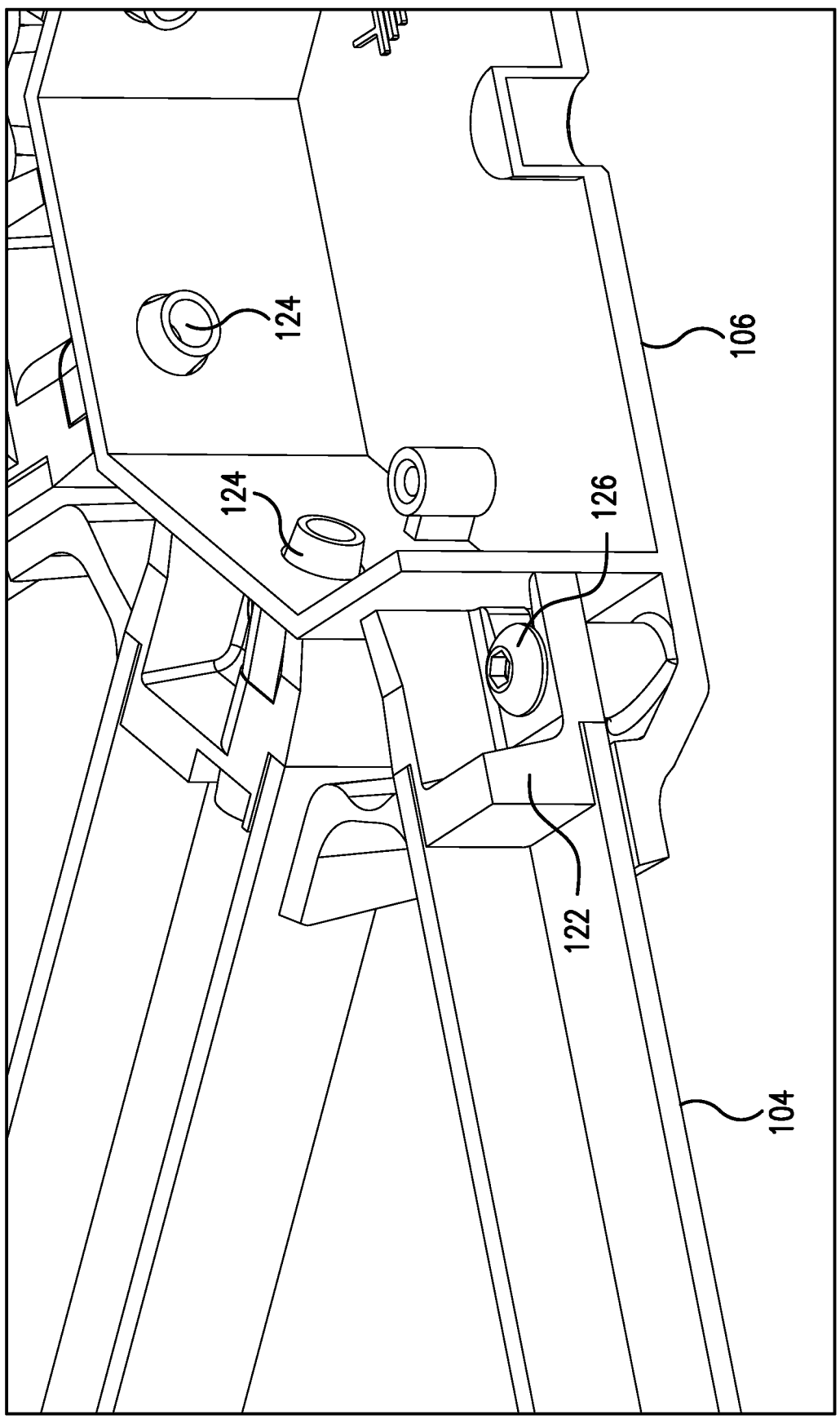
FIG. 6 is a cross-sectional enlarged bottom perspective view of the lighting system according to the embodiment of FIG. 3.

The present invention also provides a method of lighting comprising connecting a plurality of spokes 104 to a hub 106, emitting light from a light source 102 housed within the plurality of spokes 104 and connecting the hub 106 to an electrical connection housing 112. The method according to the subject embodiment may also comprise mounting sensors 116 on the hub 106 for monitoring a grow environment. The sensors 116 may be mounted on any suitable location on the hub 106 to where a grow environment may be monitored. Such location may include a top side of the hub 106, an underside of the hub 106, on or between a spoke 104 of the plurality of spokes 104 on the hub 106, or any other desired location. A cross-sectional detailed view of the underside of the hub 106 is further shown in FIG. 6. FIG. 6 shows an arm assembly of a cross-section of a spoke 104 connected to the hub 106. The fastener 126 may be installed perpendicular to an axis of the spoke 104, allowing for simple installation of the fastener 126 from an underside of the hub 106. Allowing the fastener 126 to be installed perpendicular improves the installation compared to previous lighting systems where a fastener would need to be installed parallel to a spoke or arm axis, making it difficult to drive said fastener into a hub at such an angle. Still, sealing and proper alignment of the connection between a spoke 104 and the hub 106 may be difficult given a single fastener 126 for each spoke 104. Therefore, one embodiment of the invention may also include a sealing grommet 124.

Figure 7:
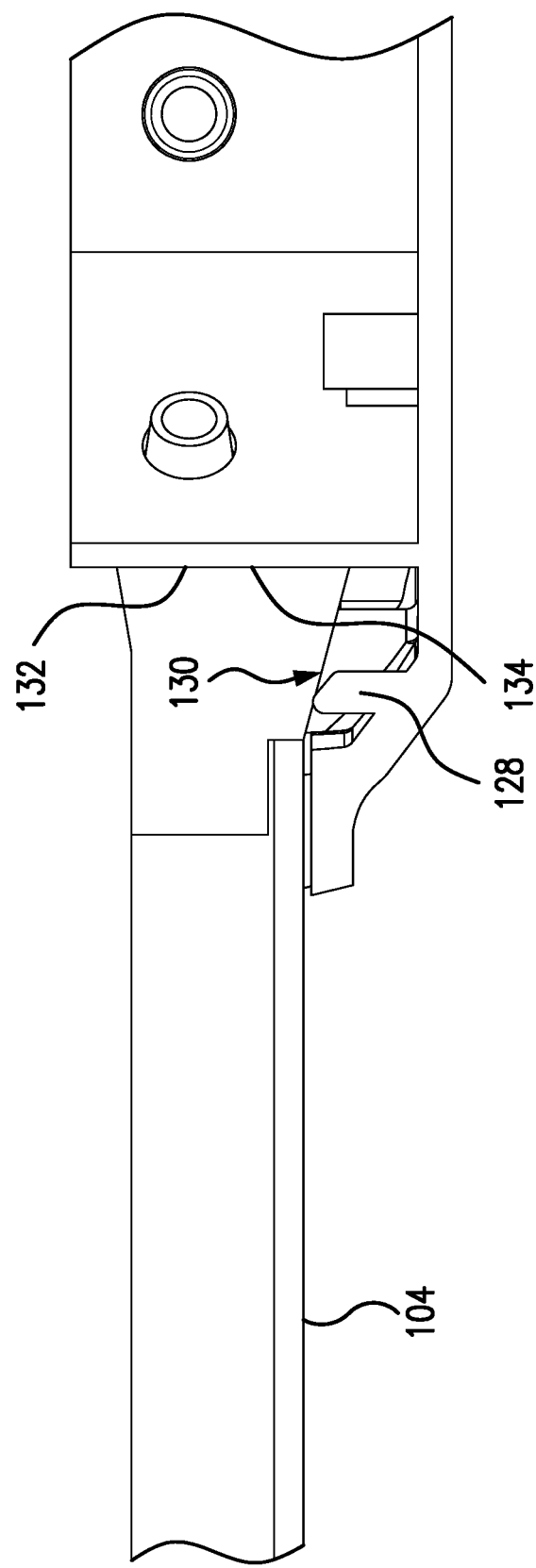
FIG. 7 is a cross-sectional side view of a spoke and a portion of a hub of the lighting system according to the embodiment of FIG. 3.

As shown in FIG. 7, proper alignment of a spoke 104 to the hub 106 may be accomplished with the use of at least one alignment surface. In one such example, the lighting system 100 has two alignment surfaces to aid in attaching each spoke 104 to the hub. An adapter alignment surface 134 may be present on a side of the adapter 122. In addition, a hub alignment surface 132 may be present on a side of the hub 106. As these alignment surfaces 132, 134 may be perpendicular in relation to the fastener 126, this embodiment may further use the aid of a hub ramp 128 and an adapter ramp 130 to achieve an optimum seal between the spoke 104 and the hub 106. This method includes driving the fastener 126 which forces the adapter ramp 130 into the hub ramp 128, thereby also forcing the adapter alignment surface 134 into the hub alignment surface 132, ensuring proper alignment of the spoke 104 to the hub 106.

In one embodiment, the method may include changing the plurality of spokes 104 on the hub 106 to modify the light source 102 for the grow environment. A spoke 104 may be changed to adapt the light source 102 for a specific crop. This may even include removal of the spoke 104 from the hub 106, as shown in FIG. 8. It is to be understood that the method may include adding and/or removing any number of spokes 104 from the hub 106 based on the needs of the grow environment. The plurality of spokes 104 house at least one light color 108. Individual spokes 104 may be controlled in groups with other spokes 104 or individually. This may be particularly important when using non-visible radiation with the method of lighting.

In another embodiment of the invention, the method of lighting may involve hanging the lighting system 100 by the chain 120. This may be apparent in instances where the lighting system 100 may have a non-rigid mounting structure. To aid the chain 120 hanging system, the method may further comprise connecting a spoke 104 of the plurality of spokes 104 to a spoke 104 of a plurality of spokes 104 on a neighboring lighting system 100. This connection may prevent neighboring lighting systems 100 from spinning about the hub 106.

In accordance with the described embodiments, the invention provides a lighting system 100 that is able to produce a high-power density with an optical footprint and the ability for air to circulate freely around and through the lighting system 100. The "wagon wheel" shape of the lighting system 100 developed from the plurality of spokes 104 into the hub 106 is able to overcome the shortcoming of the prior art by providing an overall shape where air and other gasses are able to circulate freely about the grow environment, while still being able to supply a high amount and high versatility of power as other conventional horticulture light fixtures.

The invention illustratively disclosed herein suitably may be practiced in the absence of any element, part, step, component, or ingredient which is not specifically disclosed herein. While in the foregoing detailed description this invention has been described in relation to certain preferred embodiments thereof, and many details have been set forth for purposes of illustration, it will be apparent to those skilled in the art that the invention is susceptible to additional embodiments and that certain or the details described herein can be varied considerably without departing from the basic principles of the invention.

What is claimed is:

1. A lighting system comprising:
   a light source;
   a plurality of spokes to house the light source;
   a structural hub wherein the hub is adapted to connect to the plurality of spokes;
   an adapter for each spoke of the plurality of spokes configured to connect each spoke to the hub;
   a fastener to secure the adapter; and
   a sealing grommet to seal each spoke of the plurality of spokes to the hub.

2. The lighting system of claim 1 wherein the light source comprises at least one light color.

3. The lighting system of claim 1 wherein the light source further comprises at least one radiation source.

4. The lighting system of claim 3 wherein the at least one radiation source is non-visible.

5. The lighting system of claim 4 wherein the at least one radiation source is at least one of ultraviolet and infrared.

6. The lighting system of claim 1 wherein at least one spoke of the plurality of spokes includes a light source having a different property than an adjacent spoke.

7. The lighting system of claim 1 wherein the hub further comprises an electrical connection housing.

8. The lighting system of claim 7, the hub further comprising a mount.

9. The lighting system of claim 8 wherein the mount is adapted to receive at least one sensor.

10. The lighting system of claim 1 wherein the light source is comprised of light emitting diodes.

11. The lighting system of claim 1 wherein at least one spoke of the plurality of spokes is adapted to disconnect from the hub.

12. A method of lighting comprising:
   connecting a plurality of spokes to a hub;
   emitting light from a light source housed within the plurality of spokes; and
   connecting the hub to an electrical connection housing; and
   connecting a spoke of the plurality of spokes to a spoke of a plurality of spokes on a neighboring lighting system.

13. The method of lighting according to claim 12 further comprising mounting sensors on the hub for monitoring a grow environment.

14. The method lighting according to claim 12, further comprising changing the plurality of spokes on the hub to modify the light source for the grow environment.

15. The method of lighting according to claim 12, the plurality of spokes further comprising housing at least one light color.

16. The method of lighting according to claim 12 further comprising controlling a spoke of the plurality of spokes individually.

17. The method of lighting according to claim 12 further comprising controlling the plurality of spokes as a group.

18. The method of lighting according to claim 12 further comprising hanging the lighting system by a chain.

19. The method of lighting according to claim 12, the plurality of spokes containing at least one radiation source.

20. The method of lighting according to claim 19 wherein the at least one radiation source is ultraviolet.

21. The method of lighting according to claim 19 wherein the at least one radiation source is infrared.

22. The method of lighting according to claim 12 further comprising:
   positioning an adapter between a spoke of the plurality of spokes and the hub;
   securing the adapter with a fastener; and
   sealing the spoke of the plurality of spokes to the hub with a sealing grommet.

23. The method of lighting according to claim 22 wherein sealing the spoke to the hub further comprises forcing an adapter alignment surface of the spoke into a hub alignment surface of the hub by driving an adapter ramp on the adapter into a hub ramp on the hub, thereby positioning and securing the adapter to the spoke and the hub.

24. The lighting system according to claim 23 wherein a spoke of the plurality of spokes is adapted to connect to a spoke of a plurality of spokes on a neighboring lighting system.

* * * * *